(12) United States Patent
Rey et al.

(10) Patent No.: US 9,981,543 B2
(45) Date of Patent: May 29, 2018

(54) HYBRID POWER MODULE

(71) Applicant: MOOG INC., East Aurora, NY (US)

(72) Inventors: Gonzalo Rey, Clarence Center, NY (US); George L. Small, Williamsville, NY (US)

(73) Assignee: Moog Inc., East Aurora, NY (US)

( * ) Notice: Subject to any disclaimer, the term of this patent is extended or adjusted under 35 U.S.C. 154(b) by 0 days. days.

(21) Appl. No.: 15/510,716

(22) PCT Filed: Sep. 17, 2015

(86) PCT No.: PCT/US2015/050560
§ 371 (c)(1),
(2) Date: Mar. 13, 2017

(87) PCT Pub. No.: WO2016/044513
PCT Pub. Date: Mar. 24, 2016

(65) Prior Publication Data
US 2017/0274756 A1    Sep. 28, 2017

Related U.S. Application Data

(60) Provisional application No. 62/052,049, filed on Sep. 18, 2014.

(51) Int. Cl.
*B60K 6/38* (2007.10)
*B60K 6/485* (2007.10)
(Continued)

(52) U.S. Cl.
CPC .......... *B60K 6/485* (2013.01); *B60K 6/26* (2013.01); *B60K 6/28* (2013.01); *B60K 6/365* (2013.01);
(Continued)

(58) Field of Classification Search
None
See application file for complete search history.

(56) References Cited

U.S. PATENT DOCUMENTS 5,856,709 A   1/1999 Ibaraki et al.
7,841,432 B2  11/2010 Lynn et al.
(Continued)

FOREIGN PATENT DOCUMENTS

JP  H09193676 A    7/1997
KR  20130122546 A  11/2013

OTHER PUBLICATIONS

ISA/US, International Search Report for PCT/US15/50560 dated Dec. 22, 2015.
(Continued)

*Primary Examiner* — Dirk Wright
(74) *Attorney, Agent, or Firm* — Hodgson Russ LLP

(57) ABSTRACT

A hybrid power module efficiently delivers both hydraulic power and electric power. The hybrid power module may regenerate and store energy for later use. The module includes and engine and an electric motor for driving a hydraulic pump. The electric motor is operable as a starter motor for the engine and as an assist motor cooperating with the engine to power the hydraulic pump to improve dynamic response of the hydraulic pump. The module also includes an electric power source which may have an energy storage unit, and the electric motor may be operated as an electric generator providing electric energy to the energy storage unit.

11 Claims, 2 Drawing Sheets

(51) Int. Cl.
*B60K 6/28* (2007.10)
*B60K 6/365* (2007.10)
*B60K 6/26* (2007.10)
*F16D 7/00* (2006.01)

(52) U.S. Cl.
CPC .................. *B60K 6/38* (2013.01); *F16D 7/00* (2013.01); *B60K 2006/268* (2013.01); *B60Y 2200/92* (2013.01); *Y10S 903/906* (2013.01); *Y10S 903/907* (2013.01); *Y10S 903/91* (2013.01); *Y10S 903/912* (2013.01)

(56) References Cited

U.S. PATENT DOCUMENTS

| | | |
|---|---|---|
| 8,123,656 B2 | 2/2012 | Schoenek et al. |
| 8,540,602 B2 * | 9/2013 | Ishikawa ................ B60K 6/383 180/65.245 |
| 2010/0170733 A1 | 7/2010 | Marcacci et al. |

OTHER PUBLICATIONS

ISA/US, Written Opinion of the International Searching Authority for PCT/US15/50560 dated Dec. 22, 2015.

* cited by examiner

HYBRID POWER MODULE

FIELD OF THE INVENTION

The present invention relates generally to the field of hybrid energy sources, and more particularly to a hybrid power system and module offering increased operating efficiencies and flexibility in power delivery between hydraulic output and electric output over varying loads.

BACKGROUND OF THE INVENTION

The introduction of hybrid electric vehicles, such as the Toyota Prius and Chevrolet Volt, has provided numerous examples of hybrid power systems wherein an internal combustion engine and a battery-powered electric motor are used to power a load. These systems are designed to rely solely on the electric motor, solely on the internal combustion engine, or on a combination of output from the electric motor and the engine to drive the load, depending upon demand. These systems incorporate an electrical generator that may be driven by the internal combustion engine during cruising, and by the vehicle momentum during regenerative braking, to generate electricity used to recharge the battery.

What is needed is a hybrid power system capable of delivering hydraulic power and electric power to drive a load. There is also a need for improved energy storage efficiency in the context of a hybrid power system.

SUMMARY OF THE INVENTION

In accordance with the present invention, a hybrid power module is configured to efficiently deliver both hydraulic power and electric power. The hybrid power module may regenerate and store energy for later use.

In one embodiment, the hybrid power module comprises an electric motor having a drive shaft, an engine having an output shaft, a hydraulic pump directly driven by the drive shaft, and an over-running clutch coupling the engine output shaft to the drive shaft, wherein the clutch passively allows the drive shaft to rotate at a greater rotational speed than the engine output shaft. The module further comprises an electric power source which may include an energy storage unit. The module also comprises a master controller connected to the electric motor, the engine, the hydraulic pump, and the electric power source. The electric motor is operable as a starter motor for the engine, and as an assist or boost motor helping the engine power the drive shaft to improve dynamic response of the hydraulic pump. When the module's duty cycle allows, the electric motor may be operated as an electric generator delivering electric energy to the energy storage unit. The energy storage unit may, for example, be configured as a hybrid battery/ultra-capacitor energy storage unit.

In an alternative embodiment, the hybrid power module comprises a differential gear assembly that connects the engine output shaft, the electric motor drive shaft, and a driven shaft of the hydraulic pump to one another.

The invention provides hybrid power delivery including hydraulic and electric power. The invention optionally provides fast response bi-directional energy storage to improve efficiencies when applied to high peak power to RMS power duty applications. The present invention may be utilized as a high efficiency power source for mobile autonomous systems (i.e. mobile robotics). Those skilled in the art will understand that the present invention has broad applicability beyond autonomous systems.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
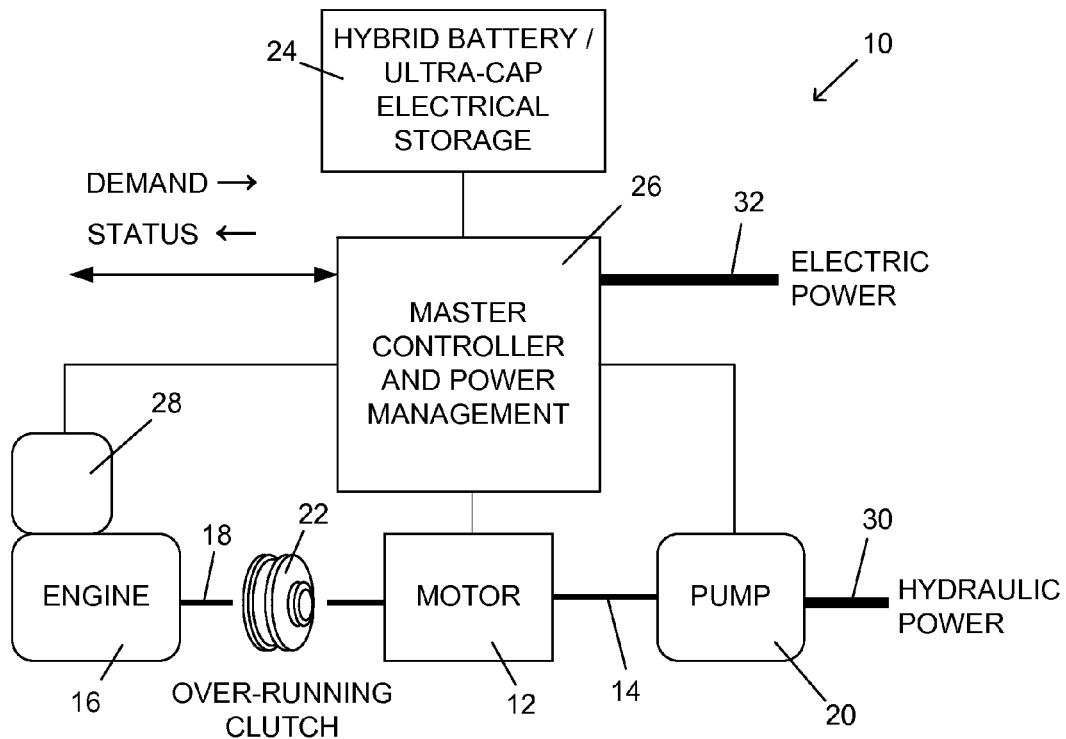
FIG. 1 is schematic block diagram of a hybrid power module formed in accordance with a first embodiment of the present invention.

FIG. 1 shows a hybrid power module 10 formed in accordance with a first embodiment of the present invention. Hybrid power module 10 is configured to deliver both hydraulic power 30 and electric power 32 for powering a load. In the illustrated embodiment, module 10 generally comprises an electric motor 12 having a drive shaft 14, an engine 16 having an output shaft 18, and a hydraulic pump 20 directly driven by drive shaft 14. In an advantageous direct-drive configuration, electric motor 12 and pump 20 may share drive shaft 14 as a common shaft. Hybrid power module 10 also comprises an over-running (i.e. freewheeling) clutch 22 that directly couples engine output shaft 18 to drive shaft 14, whereby engine 16 is operable for powering hydraulic pump 20 without energy conversion losses. Clutch 22 may be actuated by solenoid or other such means to additionally allow reverse rotational torque to flow in the freewheeling rotation direction. Module 10 of the first embodiment further comprises an electric power source 24, and a master controller 26 connected to electric motor 12, engine 16, hydraulic pump 20, and electric power source 24.

Figure 2:
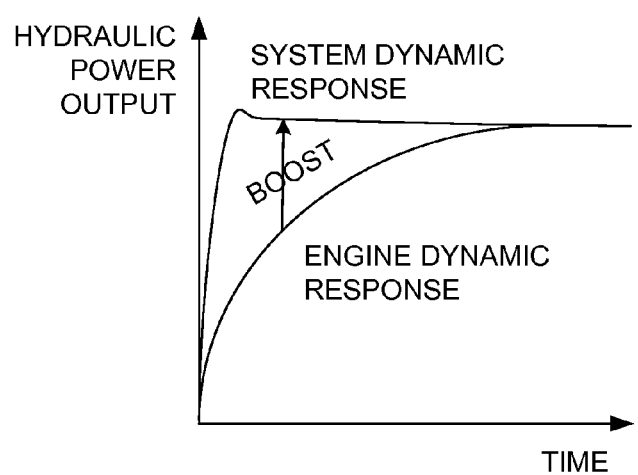
FIG. 2 is a graph of hydraulic power output versus time for the hybrid power module shown in FIG. 1.

Electric motor 12 may be a motor designed for sensorless commutation, such as a brushless DC motor or a reluctance motor. In the embodiment of FIG. 1, electric motor 12 is operable as a starter motor for engine 16, as a "boost" or assist motor for assisting engine 16 in powering hydraulic pump 20, and as an electrical generator. When electric motor 12 is used as a starter motor for engine 16, clutch 22 locks drive shaft 14 to engine output shaft 18. When electric motor 12 is used as an assist motor for assisting engine 16, clutch 22 passively allows drive shaft 14 to rotate at a greater rotational speed than engine output shaft 18, whereby electric motor may be used to boost dynamic response of module 10 in delivering hydraulic power by way of hydraulic pump 20 as compared to dynamic response achievable from engine 16 alone. The benefit of using electric motor 12 as a booster motor is graphically shown in FIG. 2. As may be understood, this feature allows module 10 to manage hydraulic supply pressure with high bandwidth. Power flow associated with electric motor 12 may be bidirectional, whereby the electric motor may act as both an assist motor and a generator. Electric motor 12, when acting as a generator, can rapidly reduce the speed of engine 16 in response to lower power demand at pump 20, and energy not needed to power the pump may be converted to electrical energy and/or stored for later use as described in greater detail below.

Engine 16 may be any prime mechanical mover. By way of non-limiting example, engine 16 may be a hydro-carbon fueled internal combustion engine, a turbine unit, or a micro-turbine unit. Engine 16 may be controlled by command signals from master controller 26, and may include sensors 28 for providing feedback to master controller 26 as to the engine's operating status. For example, engine 16 may be embodied as a hydro-carbon fueled internal combustion engine wherein fuel metering is directly controlled by commands from master controller 26, and feedback signals may be provided by engine sensors 28 hard-wired to master controller 26.

Hydraulic pump 20 converts mechanical power to hydraulic power 30 which is output by module 10. In an embodiment of the invention, hydraulic pump 20 may be a variable displacement hydraulic pump wherein the volume of fluid pumped per revolution of drive shaft 14 is variable by commands issued from master controller 26. While use of a variable displacement hydraulic pump adds complexity, it allows a further boost in dynamic response and optimization of operating parameters to reduce power losses.

Electric power source 24 may advantageously comprise an energy storage unit configured to accept and store energy, and electric motor 12 is selectively operable as an electric generator providing electrical energy stored by the energy storage unit. The energy storage unit may be a hybrid energy storage unit including at least one battery cell and at least one ultra-capacitor. For sake of illustration, when electric motor 12 is in starter mode acting as a starter motor for engine 16, it may rely primarily on power from battery cells, and when electric motor 12 is in boost mode acting as an assist motor for engine 16, it may rely primarily on power from ultra-capacitors.

In the illustrated embodiment, master controller 26 manages delivery of hydraulic power 30 and electric power 32 as respective outputs of module 10, and further manages the delivery of regenerated power from electric motor 12 to the energy storage unit of electric power source 24. Master controller 26 may be connected for data communication with the overall machine (the power consumer) that is powered by hybrid power module 10 so that module 10 is optimized to meet feed-forward demand for hydraulic power 30 and electric power 32.

As may be understood, hybrid power module 10 has various selectable modes of operation. Module 10 may operate in a pure electric mode where hydraulic power is provided solely by the electrical motor 12 and engine 16 is shut down. Module 10 has a starter mode in which electric motor 12 is operable as a starter motor for starting engine 16, and an assist mode wherein electric motor 12 is operable to assist engine 16 in powering rotation of the drive shaft 14 to boost dynamic response of hydraulic pump 20. Hybrid power module 10 may also have a regeneration mode in which electric motor 12 functions as an electric generator, whereby kinetic energy of engine output shaft 18 is converted to electric power for storage by the energy storage unit of electric power source 24.

Figure 3:
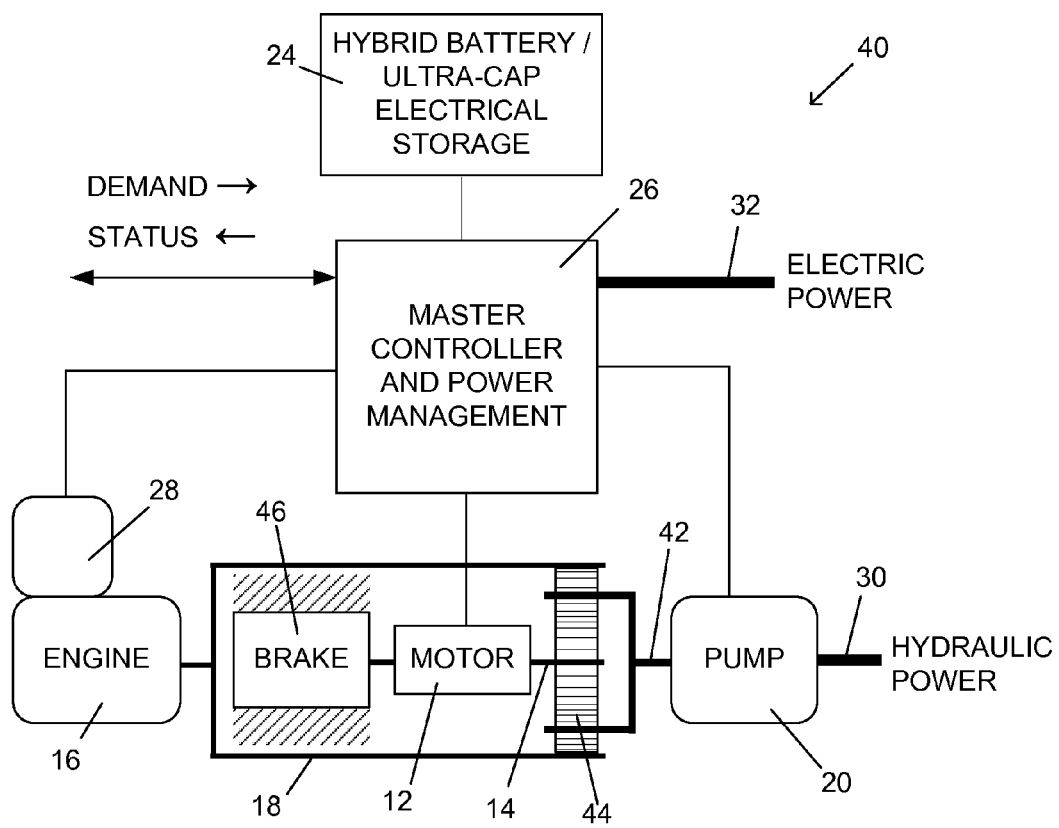
FIG. 3 is schematic block diagram of a hybrid power module formed in accordance with a second embodiment of the present invention.

FIG. 3 shows a hybrid power module 40 formed in accordance with a second embodiment of the present invention. Hybrid power module 40 is generally similar to hybrid power module 10 of the first embodiment in that it comprises electric motor 12 having drive shaft 14, engine 16 having output shaft 18, hydraulic pump 20, electric power source 24, and master controller 26. In contrast to the first embodiment, hydraulic pump 20 has its own driven shaft 42, and does not share drive shaft 14 with electric motor 12.

Hybrid power module 40 comprises a differential gear assembly 44 to modulate power flow among engine 16, motor 12, and hydraulic pump 20. Differential gear assembly 44 mechanically connects engine output shaft 18, electric motor drive shaft 14, and driven shaft 42 of hydraulic pump 20 to one another. A brake 46 is associated with drive shaft 14 of electric motor 12.

Similar to hybrid power module 10 of the first embodiment, hybrid power module 40 has various selectable modes of operation. Module 10 may operate in a pure electric mode where hydraulic power is provided solely by the electrical motor 12 and engine 16 is shut down. Module 40 has a starter mode in which electric motor 12 is operable as a starter motor for starting engine 16, and an assist mode wherein electric motor 12 is operable to assist engine 16 in powering rotation of hydraulic pump driven shaft 42 to boost dynamic response of hydraulic pump 20. Hybrid power module 40 may also have a regeneration mode in which electric motor 12 functions as an electric generator, whereby kinetic energy of engine output shaft 18 is converted to electric power for storage by the energy storage unit of electric power source 24.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A hybrid power module comprising:
    an electric motor having a drive shaft;
    an engine having an output shaft;
    a hydraulic pump directly driven by the drive shaft;
    an over-running clutch coupling the engine output shaft to the drive shaft, wherein the clutch passively allows the drive shaft to rotate at a greater rotational speed than the engine output shaft;
    an electric power source; and
    a master controller connected to the electric motor, the engine, the hydraulic pump, and the electric power source.

2. The hybrid power module according to claim 1, wherein the hybrid power module has a starter mode in which the electric motor is operable as a starter motor for starting the engine, and an assist mode wherein the electric motor is operable to assist the engine in powering rotation of the drive shaft.

3. The hybrid power module according to claim 2, wherein the hybrid power module further has a regeneration mode in which the electric motor functions as an electric generator, whereby kinetic energy of the engine output shaft is converted to electric power.

4. The hybrid power module according to claim 3, wherein the electric power source comprises an energy storage unit configured to accept and store energy, and the electric power generated by the electric motor functioning as an electric generator is stored by the energy storage unit.

5. The hybrid power module according to claim 4, wherein the energy storage unit is a hybrid energy storage unit including at least one battery cell and at least one ultra-capacitor.

6. A hybrid power module comprising:
    an electric motor having a drive shaft;
    an engine having an output shaft;
    a hydraulic pump having a driven shaft;
    a differential gear assembly connecting engine output shaft, the electric motor drive shaft, and the driven shaft of the hydraulic pump to one another;
    an electric power source; and a master controller connected to the electric motor, the engine, the hydraulic pump, and the electric power source.

7. The hybrid power module according to claim 6, wherein the hybrid power module has a starter mode in which the electric motor is operable as a starter motor for starting the engine, and an assist mode wherein the electric motor is operable to assist the engine in powering rotation of the driven shaft of the hydraulic pump.

8. The hybrid power module according to claim 7, wherein the hybrid power module further has a regeneration mode in which the electric motor functions as an electric generator, whereby kinetic energy of the engine output shaft is converted to electric power.

9. The hybrid power module according to claim 8, wherein the electric power source comprises an energy storage unit configured to accept and store energy, and the electric motor is selectively operable as an electric generator providing electrical energy stored by the energy storage unit.

10. The hybrid power module according to claim 9, wherein the energy storage unit is a hybrid energy storage unit including at least one battery cell and at least one ultra-capacitor.

11. The hybrid energy module according to claim 6, further comprising a brake associated with the drive shaft of the electric motor.

* * * * *